United States Patent [19]

Ohtani et al.

[11] Patent Number: 5,256,045
[45] Date of Patent: Oct. 26, 1993

[54] APPARATUS FOR VULCANIZING ENDLESS RUBBER BELTS

[75] Inventors: Ken-ichi Ohtani; Osamu Sakamoto; Masahiko Houzouji; Hiroshi Yamamoto, all of Kobe, Japan

[73] Assignee: Bando Kagaku Kabushiki Kaisha, Kobe, Japan

[21] Appl. No.: 755,283

[22] Filed: Sep. 5, 1991

[30] Foreign Application Priority Data

Sep. 7, 1990 [JP] Japan ................. 2-237725

[51] Int. Cl.$^5$ ............................. B29C 35/04
[52] U.S. Cl. ...................... 425/28.1; 156/137; 264/320; 425/34.2; 425/373; 425/394; 425/402; 425/818
[58] Field of Search ............... 156/137–141; 264/236, 347, 320; 425/28.1, 34.2, 371, 373, 402, 818, 394

[56] References Cited

U.S. PATENT DOCUMENTS

| | | | |
|---|---|---|---|
| 1,656,251 | 1/1928 | Till | 425/402 |
| 2,310,642 | 2/1943 | Marcy | 425/373 |
| 2,529,301 | 11/1950 | Lykken | 425/818 |
| 3,121,912 | 2/1964 | Dieckmann | 425/371 |
| 3,700,365 | 10/1972 | Spicer | 425/34.2 |
| 3,891,364 | 6/1975 | Muller | 425/373 |
| 4,058,424 | 11/1977 | Breher | 425/373 |
| 4,140,456 | 2/1979 | Sato | 425/402 |
| 4,150,581 | 4/1979 | Walters | 156/137 |
| 4,389,182 | 6/1983 | Gersbeck | 425/373 |

FOREIGN PATENT DOCUMENTS 2552010 5/1977 Fed. Rep. of Germany ...... 156/137

Primary Examiner—Jeffery Thurlow
Assistant Examiner—Mathieu Vargot
Attorney, Agent, or Firm—Marshall, O'Toole, Gerstein, Murray & Borun

[57] ABSTRACT

A vulcanizing apparatus including a cylindrical vulcanizing drum for winding and molding unvulcanized rubber belt materials thereover, the vulcanizing drum being removably and rotatably supported on a transfer mechanism. A pair of endless pressurizing bands are arranged to oppose each other with the vulcanizing drum between, the pressurizing bands arcuately surrounding and pressing the corresponding portions of the circumferential surface of the vulcanizing drum. While the circumferential surface of the vulcanizing drum is heated inside, and the respective pressurizing bands are opposingly pressed against the vulcanizing drum, the respective pressurizing bands are synchronously rotated so as to turn the vulcanizing drum and continuously vulcanize the unvulcanized rubber belt molding on the drum.

2 Claims, 9 Drawing Sheets

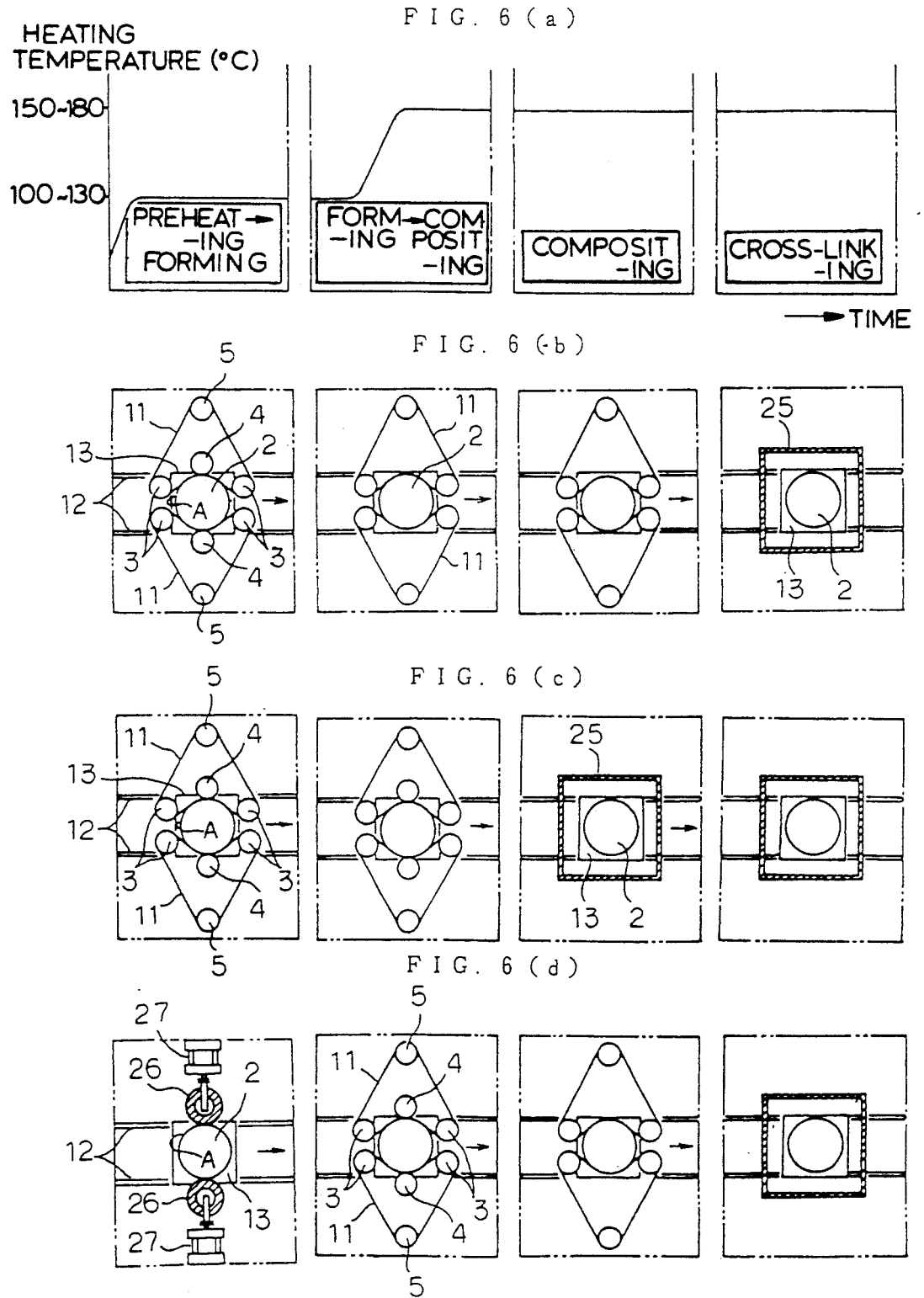

APPARATUS FOR VULCANIZING ENDLESS RUBBER BELTS

FIELD AND BACKGROUND OF THE INVENTION

The present invention relates to an apparatus and method for continuously vulcanizing endless rubber belts such as flat belts or V-belts, and more specifically, the present invention relates to a vulcanizing apparatus and method particularly suited to vulcanization of toothed belts or the like.

Among vulcanizing apparatus of this nature, there is one type called "rotary cure" having the following construction: As shown in FIG. 9, an endless unvulcanized rubber belt molding A is placed across a vulcanizing drum 32 and a tension pulley 30, which are arranged at a certain distance from each other. An endless pressurizing band 41 is placed around a pair of guide rolls 33 and arranged with the vulcanizing drum 32 between and also around a tension roll 35 which is arranged in an intermediate axis between the guide rolls 33. A tensile force is exerted to the tension roll 35 by means of a pressure cylinder 39, and the pressurizing band 41 is pressed against the outside of the rubber belt molding A on the circumference of the vulcanizing drum 32 to pressurize the molding A. The vulcanizing drum 32 is rotated, while the circumferential surface of the vulcanizing drum 32 is heated by an internal heat source. The prior art literature includes provisional Patent Publication SHO-59-68222 in which a vulcanization apparatus having a construction similar to that of FIG. 9 is described.

The above-mentioned vulcanizing apparatus of the rotary cure type (FIG. 9), however, has some problems that will be explained later. Hence endless rubber belts are normally vulcanized by the following vulcanizing method using a vulcanizing apparatus as shown in FIG. 10: Rubber belt materials comprising, for example, unvulcanized rubber sheets, cords and canvas, are wound and molded over the outer circumferential surface of a cylindrical vulcanizing drum 50. Then a rubber sleeve 51 is placed over the rubber belt molding A. The vulcanizing drum 50 is then lifted by a crane (not illustrated) or the like and placed in a vulcanizing can 52. A cover 52a is closed, and then steam is introduced into the vulcanizing can 52 to pressurize and heat the molding A to vulcanize it.

The aforementioned rotary cure type vulcanizing apparatus (shown in FIG. 9) has the following problems:

(1) The job is complicated and takes much time since an endless rubber belt molding A must be placed across the vulcanizing drum 32 and the tension pulley 30 while both are axially supported.

(2) The pressing force from the pressurizing band 41 works on the vulcanizing drum 32 from only one side. Hence the supporting apparatus for axially supporting the vulcanizing drum 32 must be large enough to bear the large axial load.

(3) As clearly shown in FIG. 9, only a limited portion of the unvulcanized rubber belt molding A is pressurized and heated (vulcanized) at a time. It, therefore, takes much time to vulcanize, and the pressurization of the rubber belt molding A tends to be inadequate to completely remove the air, resulting in defects in the product, such as separation between internal constituent members of the rubber belt molding A and generation of pin holes.

(4) Small-sized rubber belt moldings cannot be vulcanized since the endless belt molding A must be placed across two shafts, namely, the vulcanizing drum 32 and the tension pulley 30.

(5) To facilitate the placement and removal of an endless rubber belt molding A, the vulcanizing drum 32 is cantilevered (axial support) in many cases. If the vulcanizing drum 32 is of the cantilevered type, the vulcanizing drum 32 will be deflected in the axial direction when the drum 32 is pressed in one direction by the pressurizing band 41. Thus the pressurization of the rubber belt molding A will be irregular.

The conventional vulcanizing method using the vulcanizing apparatus of FIG. 10 has the following problems:

(1) Placement of the vulcanizing drum 50 in the vulcanizing can 52 and removal of the vulcanizing drum 50 from the vulcanizing can 52 are accomplished largely by manual laborers, and are difficult to be automatized. It is also difficult to secure sufficient workers because of the current shortage of labor.

(2) The operation is a batch process since the whole course of vulcanization is done in one vulcanizing can 52. It, therefore, takes much time to vulcanize, and the production efficiency is low.

SUMMARY OF THE INVENTION

The present invention was made with a view to overcome the aforementioned problems, and is intended to provide a vulcanizing apparatus wherein placement and removal of an endless rubber belt molding are easy, the vulcanizing drum is free of any unbalanced load, the diameter of the support shaft of the vulcanizing drum can be made smaller to reduce the size of the drum, and small-sized rubber belt moldings as well as large-sized ones can be continuously vulcanized. The invention also relates to a method for continuous vulcanizing with the aforesaid vulcanizing apparatus.

To achieve the aforementioned objectives, the vulcanizing apparatus according to the present invention comprises: a) a cylindrical vulcanizing drum for winding and molding unvulcanized rubber belt materials thereover, said vulcanizing drum being removably and rotatably supported on a transfer mechanism, b) a pair of pressurizing bands being arranged to oppose each other with said vulcanizing drum between them, said pressurizing bands being capable of arcuately surrounding and pressing the corresponding portions of the circumferential surface of said vulcanizing drum, and said vulcanizing apparatus being arranged in such a way that c) while the circumferential surface of the said vulcanizing drum is heated inside, and the respective pressurizing bands are opposingly pressed against the vulcanizing drum, the respective pressurizing bands are synchronously rotated in the respective specified directions so as to turn said vulcanizing drums and continuously vulcanize the unvulcanized rubber belt molding.

Further, a pressurizing roll may be provided on each pressurizing band for pressing the circumferential surface of said vulcanizing drum, in such a way that the pressurizing rolls may be moved forward to and backward from each other.

The vulcanizing method according to the present invention is A) a method of winding and molding rubber belt materials such as unvulcanized rubber sheets, cords and canvas over the outer circumferential surface of a cylindrical vulcanizing drum and then vulcanizing said rubber belt molding, wherein B) the vulcanizing process is subdivided into plural steps and said vulcanizing drum is sequentially transferred to and held at a specified period in each of these subdivided vulcanizing steps, C) in the first vulcanizing process a pair of opposing rubber rolls or a pair of opposing endless pressurizing bands being capable of arcuately surrounding the vulcanizing drum are pressed against the rubber belt molding on the vulcanizing drum and rotated to turn the vulcanizing drum and at the same time the interior of the vulcanizing drum is heated, and D) in each of the second through the one before last vulcanizing steps, a pair of endless pressurizing bands being capable of arcuately surrounding the vulcanizing drum are pressed against the rubber belt molding on the vulcanizing drum and rotated to turn the vulcanizing drum, and at the same time the interior of the vulcanizing drum is heated, and E) in the final process the vulcanizing drum is brought into a heating chamber to heat the drum from the sides.

It is desirable to set the heating temperature substantially in the range from 100 to 130° C. in said first vulcanizing process and the first half of the second vulcanizing process and the heating temperature substantially in the range of from 150 to 180° C. in and after the second half of said second vulcanizing process.

In the vulcanizing apparatus of the aforementioned configuration according to the present invention, said vulcanizing drum with unvulcanized rubber belt materials wound and molded over the circumferential surface thereof is rotatably held, and pressurizing bands are circumferentially pressed against opposing portions of the rubber belt molding on the vulcanizing drum to pressurize the molding. Under this condition, for example, steam is introduced into the interior of the vulcanizing drum to heat the rubber belt molding, and at the same time the respective pressurizing bands are synchronously rotated in their respective specified directions. As a result, the rubber belt molding on the vulcanizing drum is rotated together with the vulcanizing drum and gradually vulcanized; the rubber belt molding will be vulcanized completely after one to several turns of the vulcanizing drum. The vulcanizing drum is free of any unbalanced load across the axis thereof and the load on the support thereof is very small since a pair of pressing forces (loads) are exerted on the vulcanizing drum in opposing directions by a pair of pressurizing bands. Furthermore, the rubber belt molding on the vulcanizing drum is entirely and evenly heated from the inside of the drum, and the greater part of the rubber belt molding is surrounded and pressurized by the pressurizing bands; thus the rubber belt molding will be vulcanized entirely and evenly.

Further, the rubber belt molding on the vulcanizing drum is pressurized by the pressurizing belts, and in addition to it, the molding is also pressurized by the pressurizing rolls via the pressurizing bands. Accordingly, when toothed rubber belts are to be produced with vulcanizing drums having tooth molds, air will be completely removed from the interfaces of the respective components of the rubber belt molding, and teeth will be formed accurately.

In the vulcanizing method having the aforementioned configuration according to the present invention for example, toothed rubber belts are vulcanized in four steps. A vulcanizing drum with rubber belt materials being wound and molded over the circumferential surface thereof is transferred to the first vulcanizing process. In this first vulcanizing process, the rubber belt molding is pressurized by a pair of rubber rolls or a pair of pressurizing bands and at the same time heated by the heat coming from the inside of the vulcanizing drum. In this way, the rubber belt molding is preheated and formed, including the teeth, into belt products.

After that, the vulcanizing drum is transferred to the second vulcanizing process wherein the rubber belt molding is pressurized by a pair of pressurizing bands, and at the same time the molding is heated by heat coming from the inside of the vulcanizing drum. Thus the forming into the products in said preceding process is continued, and in succession, joining (or compositing) of the constituent members (canvas, cords, etc.) of the rubber belt molding is effected by cross-linking the unvulcanized rubber portions of the constituent members (canvas, cords, etc.) of the rubber belt molding.

Next, the vulcanizing drum is transferred to the third vulcanizing process, and in the same manner as the second vulcanizing process, the rubber belt molding is pressurized by a pair of pressurizing bands and at the same time heated by heat coming from the inside of the vulcanizing drum. In this way, the compositing of various constituent members (canvas, cords, etc.) of the rubber belt molding is continued by cross-linking the unvulcanized rubber of the respective constituent members (canvas, cords, etc.) of the rubber belt molding.

The vulcanizing drum is transferred to the final vulcanizing step, and brought into the heating chamber wherein the rubber belt molding on the vulcanizing drum is circumferentially heated to cross link the unvulcanized rubber, in succession to said third vulcanizing process, to composite the respective constituent members (canvas, cords, etc.) of the rubber belt molding. When all of the vulcanizing processes are completed, the vulcanizing drum is transferred to the next process wherein the drum is cooled down.

Further, the viscosity of the rubber in the rubber belt molding is reduced by the temperature setting (100 to 130° C.) of the first vulcanizing process and the first half of the second vulcanizing process. As a result, the fluidity of the rubber is improved, and the rubber is optimized for the forming of belts. The temperature setting (150 to 180° C.) of the second half of the second vulcanizing process and thereafter optimizes the rubber in the rubber belt molding for cross-linking and compositing of the respective constituent members including canvas and cords.

BRIEF DESCRIPTION OF THE DRAWINGS

FIGS. 6(a) to 6(d) illustrate an embodiment of the vulcanization method according to the present invention; FIG. 6(a) is a diagram showing temperature conditions and functions of the respective subdivided vulcanizing processes, and FIGS. 6(b) through (d) are plan views showing vulcanizing apparatus;

DETAILED DESCRIPTION OF THE INVENTION

Figure 1:
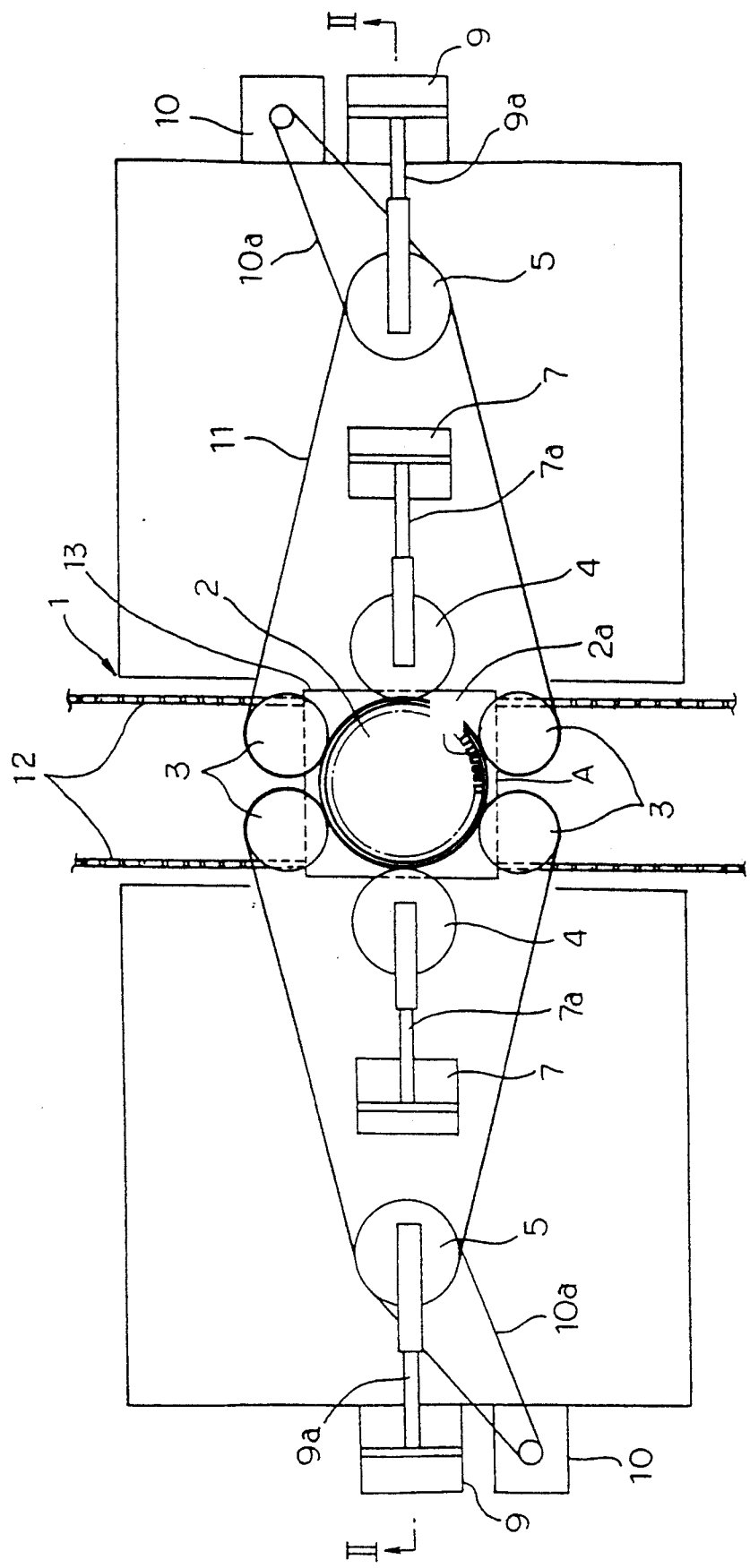
FIG. 1 is a view schematically showing a vulcanizing apparatus according to the present invention.

In the following, an embodiment of the vulcanizing apparatus according to the present invention is described with reference to the attached drawings.

As shown in FIGS. 1 through 4, a vulcanizing drum 2 is placed in the center of an apparatus proper or machine 1. On both sides of the drum 2, a pair of guide rolls 3, 3 are arranged with the vulcanizing drum 2 between them. On the central axis of the vulcanizing drum 2, a pair of opposing pressurizing rolls 4, 4 and a pair of opposing tension rolls 5, 5 are arranged from each side of the vulcanizing drum 2. The respective rollers 3 through 5 are rotatably supported on the machine frame by bearings.

The respective guide rolls 3, pressurizing rolls 4, and tension rolls 5 are arranged in the apparatus proper 1 in such a way that the guide rolls 3 and pressurizing rolls 4 can contact or move away from the vulcanizing drum 2, and so that the tension rolls 5 are movable on a central axis of the vulcanizing drum 2.

Figure 2:
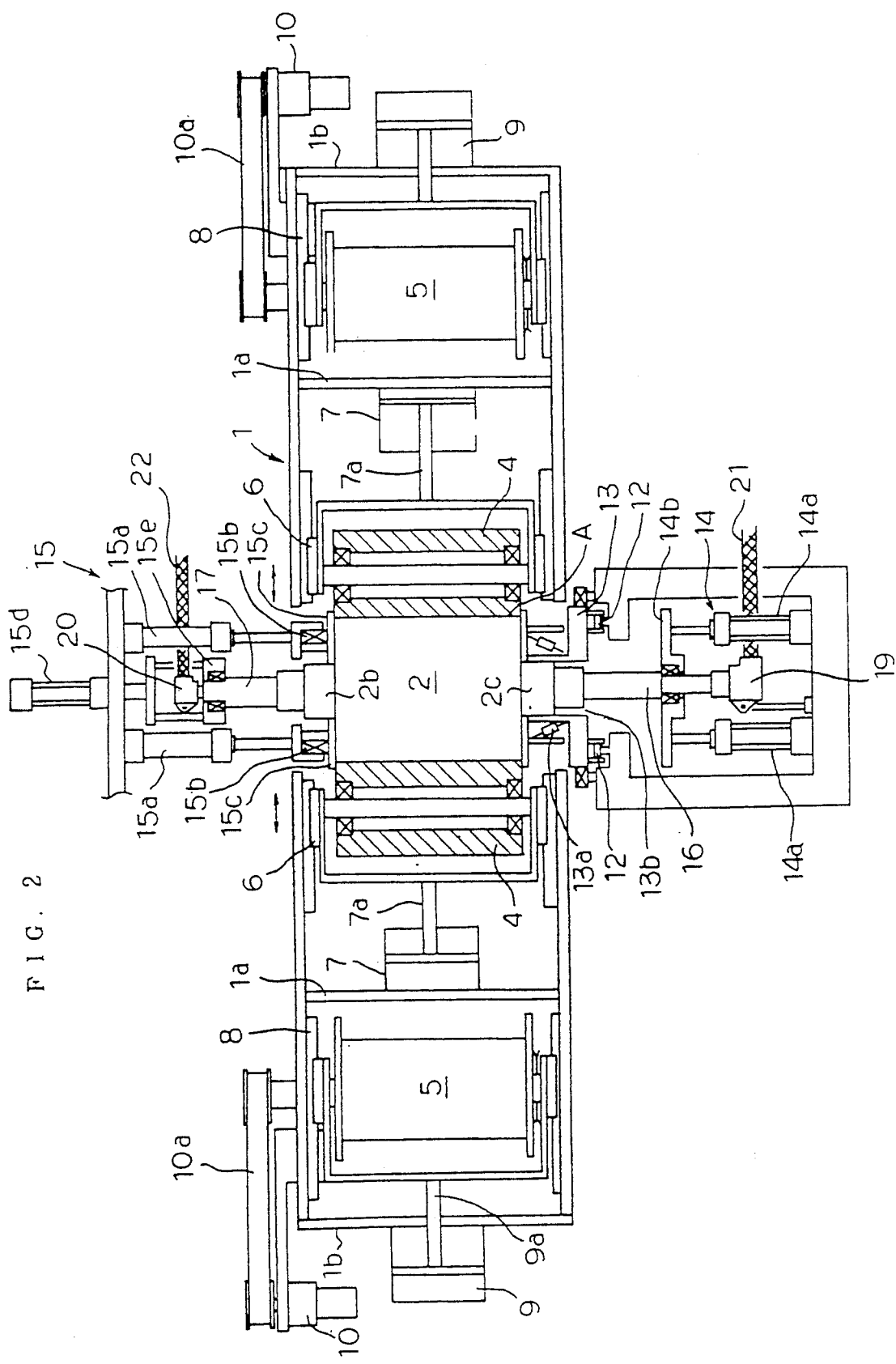
FIG. 2 is a sectional view along the lines II—II of FIG. 1, showing the state of vulcanization.

As shown in FIG. 2, the pressurizing rolls 4 are movable toward and away from the central axis of the vulcanizing drum 2 via a plurality of guide members 6. The movements of the pressurizing rolls 4 are effected by the extension and retraction of the piston rods 7a of hydraulic cylinders 7 fixed to support members 1a of the frame of the apparatus proper 1, the rods 7a being connected to the rolls 4 by U-shaped members 7b.

The tension rolls 5 are also movable toward and away from the axis of the drum 2 via the guide members 8, and their movements are also effected by the extension and retraction of the piston rods 9a of the hydraulic cylinders 9 fixed to the support members 1b of the frame of the apparatus proper 1. U-shaped members 9b are connected between the rods 9a and the rolls 5. Each tension roll 5 is connected to a drive motor 10 by means of a toothed belt 10a which connects the motor with the axle of the roll 5. Each drive motor 10 is mounted on a member 9b and shifts together with the tension roll 5 according to the extension and retraction of the piston rod 9a.

Although not illustrated, the guide rolls 3 may be movably mounted to be shifted by feed screw mechanisms, or by hydraulic cylinders as is the case of the other rolls 4 and 5.

An endless pressurizing band 11 is placed around each pair of guide rolls 3, 3 and the tension roll 5 on each side of the drum 2. A flat rubber band, a steel band or the like may be used as the pressurizing band 11. When the size (the outer diameter) of the vulcanizing drum 2 is small, a flat rubber band with good flexibility is appropriate.

Figure 3:
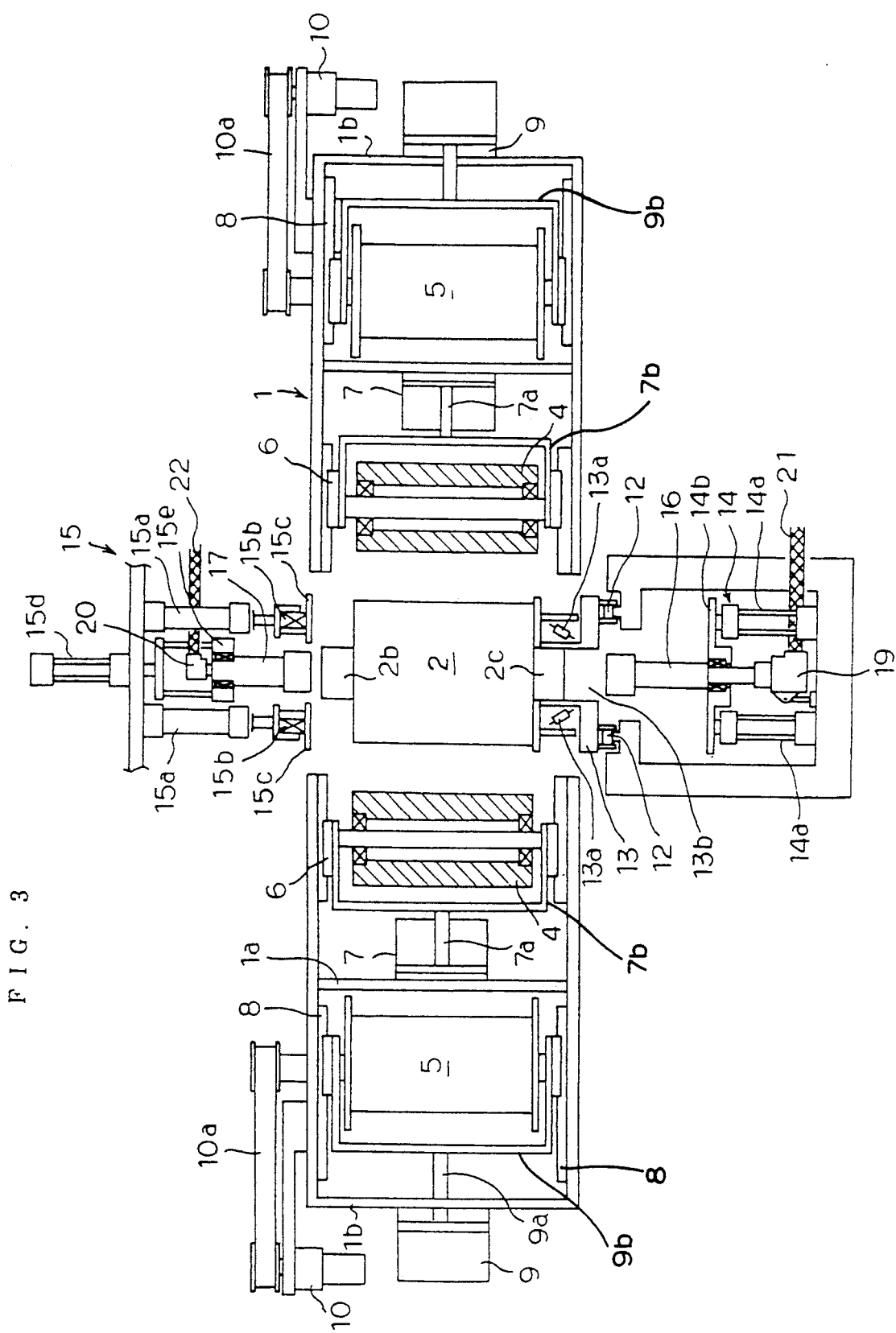
FIG. 3 is a sectional view along the lines II—II of FIG. 1, showing the state prior to vulcanization.
Figure 4:
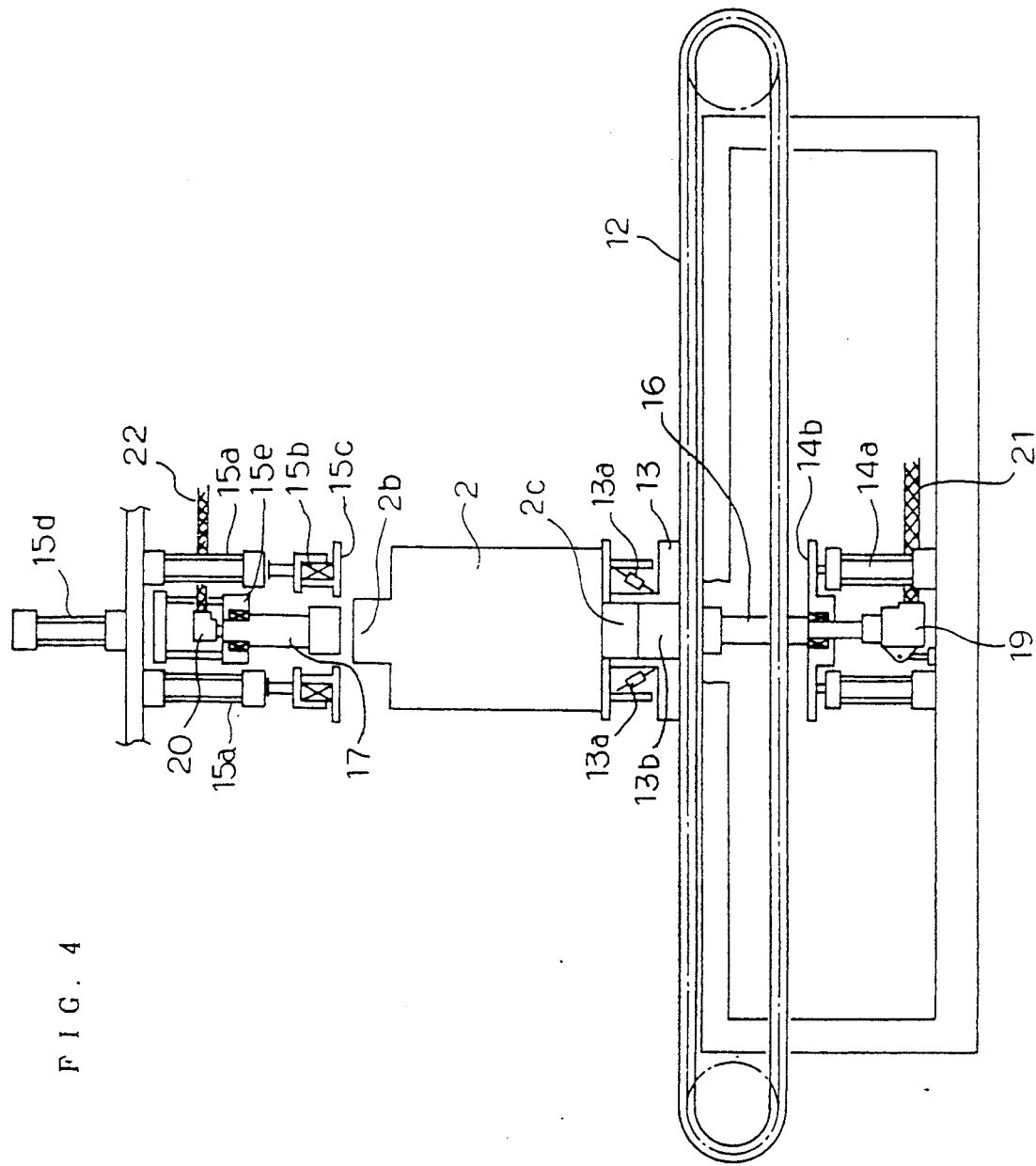
FIG. 4 is a sectional view showing the vulcanizing apparatus of FIG. 3, but seen from a different direction.

The vulcanizing drum 2 forms a mold comprising a cylindrical body having tubular hubs 2b and 2c forming openings in the centers of the top and the bottom thereof. Axially extending teeth molds 2a (FIG. 1) are formed at regular intervals around the circumferential surface of the vulcanizing drum 2. The vulcanizing drum 2 is rotatably and removably placed, as shown in FIG. 4, on a chuck stand (carrier stand) 13 via a bearing 13a. The chuck stand 13 is transported by a pair of chains 12 (see FIGS. 1 and 4), extending along the center of the apparatus proper 1 perpendicularly of the axis of the drum 2. The center of the chuck stand 13 is provided with an opening 13b (FIGS. 2 and 3).

Beneath and above the center of the apparatus proper 1, mechanisms 14, 15 for holding the vulcanizing drum 2 loaded on the chuck stand 13 are provided in such a way that they can be moved upwardly and downwardly. The holding mechanism 14 on the lower side is provided with a fixing member 14b which is raised or lowered by a plurality (for example, four) of hydraulic cylinders 14a. A steam exhaust pipe 16 extends upwardly from the center of this fixing member 14b, the steam exhaust pipe 16 being rotatably mounted on the fixing member 14b. The fixing mechanism 15 on the upper side is raised or lowered by a plurality (for example, four) of hydraulic cylinders 15a, and is provided with pressing members 15c and a fixing member 15e, the pressing members 15c being supported in such a way that the pressing members 15c are horizontally rotatable, and the fixing member 15e being raised or lowered by a hydraulic cylinder 15d. A steam feeding tube 17 is rotatably mounted on and extends downwardly from the center of this fixing member 15e.

When the cylinders 14a, 15a and 15d are extended to the state shown in FIG. 2, the steam exhausting pipe 16 will be connected to the opening of the lower hub 2c, and the steam feeding tube 17 to the opening of the upper hub 2b of the vulcanizing drum 2, respectively. Furthermore, the top of the vulcanizing drum 2 will be pressed by the pressing members 15c, and the vulcanizing drum 2 will be fixed in the center of the apparatus proper 1. The lower end of the exhaust pipe 16 and the upper end of the feeding tube 17 are connected to rotary joints 19, 20, respectively, and they are supported by bearings. The lower rotary joint 19 is connected with a steam exhaust hose 21, and the upper rotary joint 20 is connected with a steam feeding hose 22.

Figure 5A:
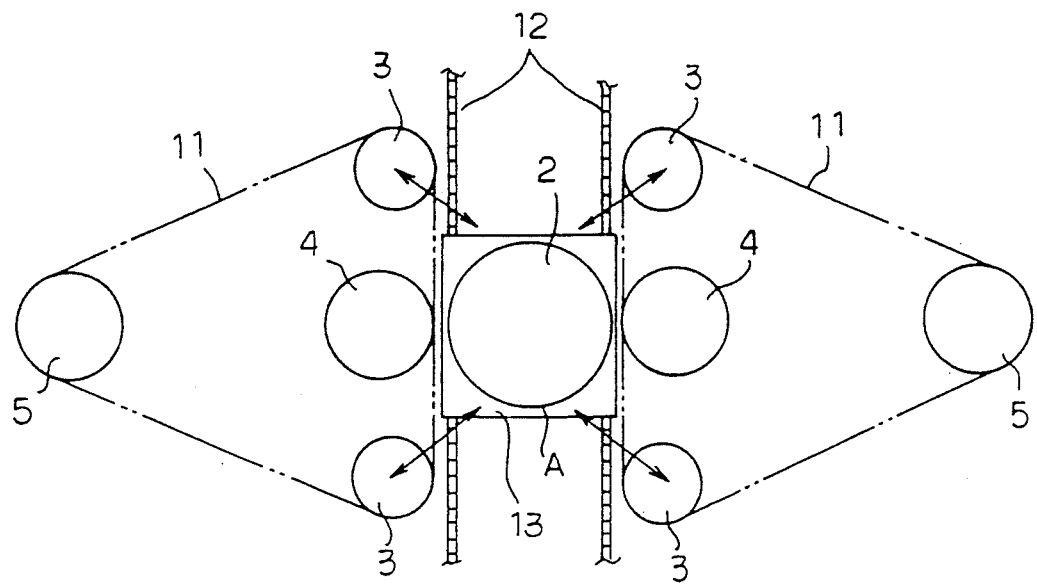
FIGS. 5(a) and 5(b) are plan views showing the states of shift of the respective rolls of the vulcanizing apparatus of FIG. 1.

Next, the operation of the vulcanizing apparatus of the aforementioned configuration of the invention will be explained. When the vulcanizing drum 2 is to be transferred, as shown in FIG. 5(a), the guide rolls 3, 3 and the pressurizing rolls 4 are separated from the vulcanizing drum 2, and the tension rolls 5 are free from any tensile forces applied by the hydraulic cylinders 8. Under this condition, in a production process of toothed transmission belts, for example, a vulcanizing drum 2 with rubber belt materials such as canvas, cords and unvulcanized rubber sheets wound and molded over the outer circumferential surface thereof is rotatably placed on the chuck stand 13 and then transferred to and placed in the center, between the tubes 16 and 17, of the apparatus proper 1 by the chains 12.

The respective cylinders 14a, 15a and 15d are then extended to hold the vulcanizing drum 2, and at the same time, the steam exhaust pipe 16 will be connected to the lower opening 2c and the steam feeding tube 17 to the upper opening 2b, respectively (see FIG. 2).

Figure 5B:
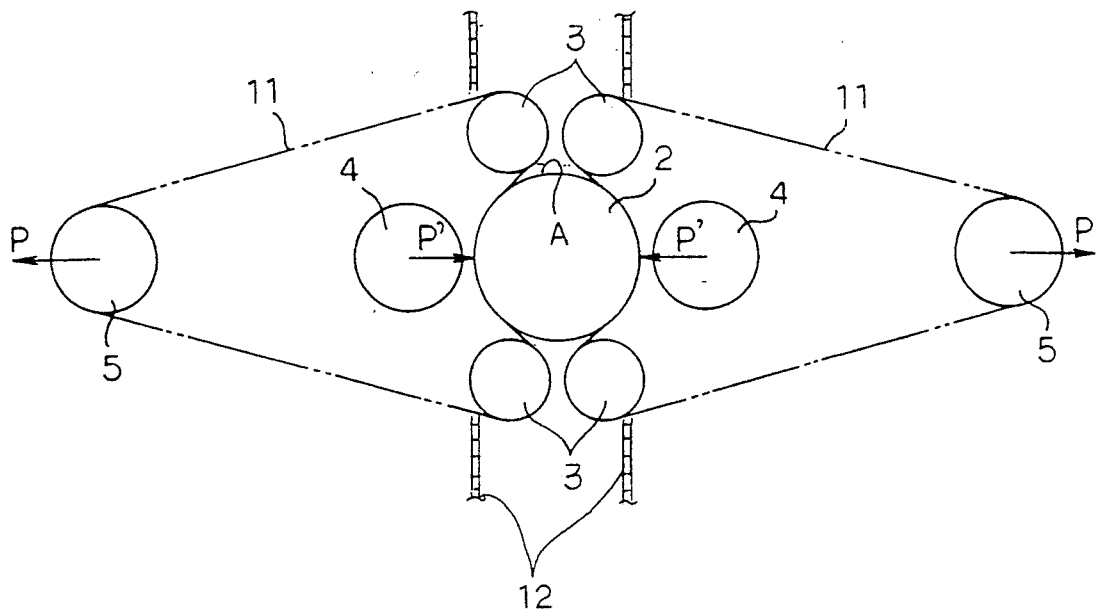

Then the pairs of guide rolls 3, 3 on both sides of the vulcanizing drum 2 are shifted simultaneously towards the vulcanizing drum 2 by means of feed screw mechanisms (not illustrated) to arcuately surround, with the pressurizing bands 11, the corresponding portions of the rubber belt molding A on the circumferential surface of the vulcanizing drum 2 as shown in FIG. 5(b). Next, the tension rolls 5 on both sides are moved away from the vulcanizing drum 2 by the hydraulic cylinders 9 (FIG. 1) to exert tensile forces on the pressurizing bands 11. This in turn creates pressure on the rubber belt molding A on the vulcanizing drum 2. More over, the pressurizing rolls 4 on both sides are shifted towards the vulcanizing drum 2 by the hydraulic cylinders 7 (FIG. 1) to apply line pressures on the rubber belt molding A through the pressurizing bands 11.

In this condition, steam is introduced into the vulcanizing drum 2 to heat the rubber belt molding A. At the same time, the pressurizing bands 11 on both sides are equidirectionally rotated clockwise, slowly and in synchronization, by drive motors 10. As a result, the rubber belt molding A over the circumferential surface of the vulcanizing drum 2 will turn together with the vulcanizing drum 2, and will be completely vulcanized after the vulcanizing drum 2 makes at least one turn. The bearings 13a allow the drum 2 to rotate on the stand 13. The rubber belt molding A on the vulcanizing drum 2 will be pressurized by the pressurizing bands 11, and in addition, the rubber belt molding A will receive line pressures from the pressurizing rolls 4 through the pressurizing bands 11. Hence teeth corresponding to the tooth molds 2a in the circumferential surface of the vulcanizing drum 2 (FIG. 1) will be formed accurately on the rubber belt. A shown in FIG. 1, the pressurizing bands 11 exert a pressure on a majority of the are of the rubber belt molding. As a result, the rubber belt molding is uniformly bent due to its positioning on the vulcanizing drum 2 and also uniformly heated.

In the aforementioned vulcanizing apparatus, to produce toothed rubber belts, a vulcanizing drum 2 having tooth molds 2a formed in the circumferential surface is used as shown schematically in FIG. 1, and at the same time, to increase the pressurizing force and precisely form the teeth, pressurizing rolls 4 opposed to each other are provided. When flat belts or V-belts without any teeth are to be produced, it is natural to use a vulcanizing drum with a flat circumferential surface, and the pressurizing rolls 4 may be omitted.

An unvulcanized rubber belt molding A can be completely vulcanized with the vulcanizing apparatus of the aforementioned embodiment in the aforementioned manner. Next, a preferable vulcanizing method according to the present invention will be described, by way of an example, wherein the aforementioned vulcanizing apparatus is used as a part of the vulcanizing facility.

In the vulcanizing method according to the present invention, the vulcanizing process is subdivided into a plurality of steps (four steps in the present embodiment). As shown in FIG. 6(a), the vulcanizing process includes the first step comprising preheating of a rubber belt molding A and forming the shape of a basic form of the final product (rubber belts); the second step comprises forming in succession to the first process and joining (compositing) of the respective constituent members (rubber sheets, canvas and cords) of the rubber belt molding A; the third step comprises compositing, in succession of the second step, of the respective constituent members of the rubber belt molding A; and the fourth step comprises cross-linking of the rubber belt molding A. The heating temperature of the rubber belt molding A is set at substantially 100 to 130° C. in the first vulcanizing step and in the first half of the second vulcanizing step, and the heating temperature is increased to about 150 to 180° C. in the second half of the second vulcanizing step and thereafter.

A vulcanizing drum 2 which is held rotatably on a chuck stand 13 is sequentially shifted by chains 12 through vulcanizing facilities dedicated respectively to the aforementioned subdivided vulcanizing steps, and the vulcanizing drum 2 is held in each vulcanizing step or station for a specified period. In the vulcanizing method shown in FIG. 6(b), the vulcanizing facility for the first step uses the vulcanizing apparatus of the aforementioned embodiment described in connection with FIGS. 1 to 5. The second and third steps use the vulcanizing apparatus of the aforementioned embodiment but without the pressurizing rolls 4. The vulcanizing facility of the fourth step uses a closed oven-type heating chamber 25 having doors 25a as shown in FIG. 7.

Figure 7:
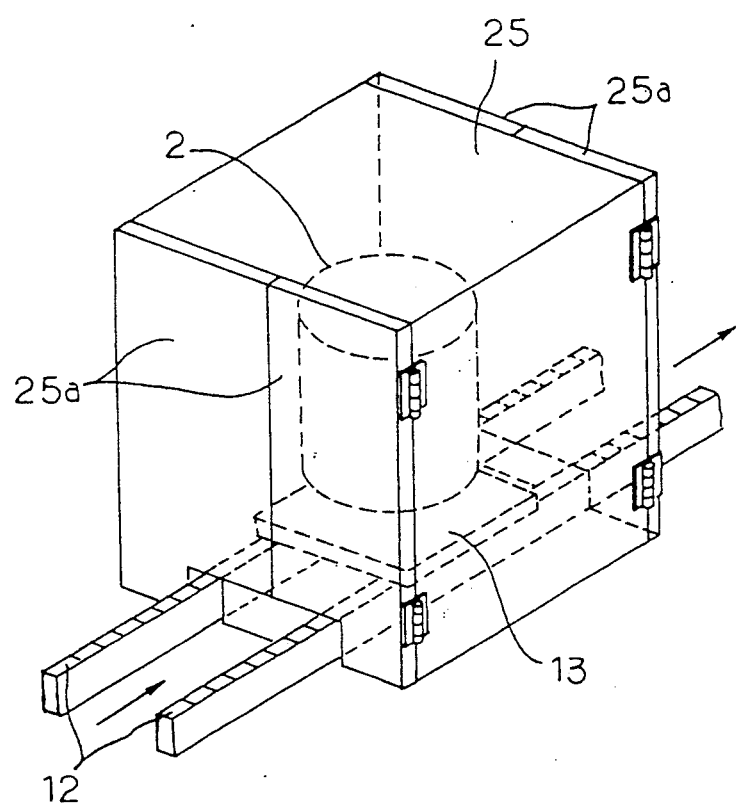
FIG. 7 is a perspective view showing a vulcanizing apparatus comprising a heating chamber of the oven type.

In the embodiment of the vulcanizing method shown in FIG. 6(c), the vulcanizing facilities of the first step and the second step use the vulcanizing apparatus of the aforementioned embodiment of FIGS. 1 to 5, and the vulcanizing facilities of the third and fourth steps use the oven-type heating chambers 25 shown in FIG. 7.

Figure 8:
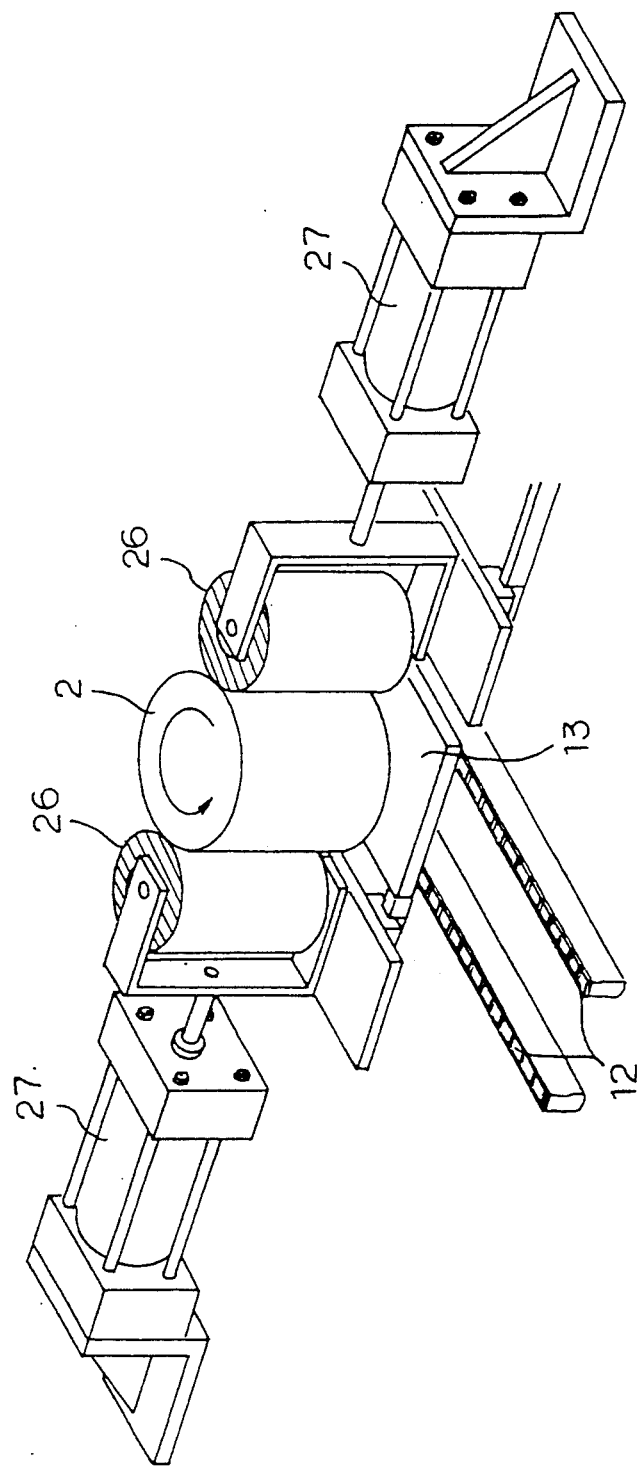
FIG. 8 is a perspective view showing a vulcanizing apparatus having rubber rollers.
Figure 9:
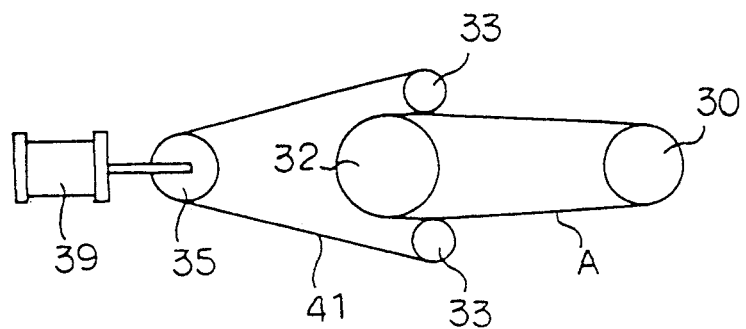
FIG. 9 is a schematic view showing a conventional two. axial vulcanizing apparatus.
Figure 10:
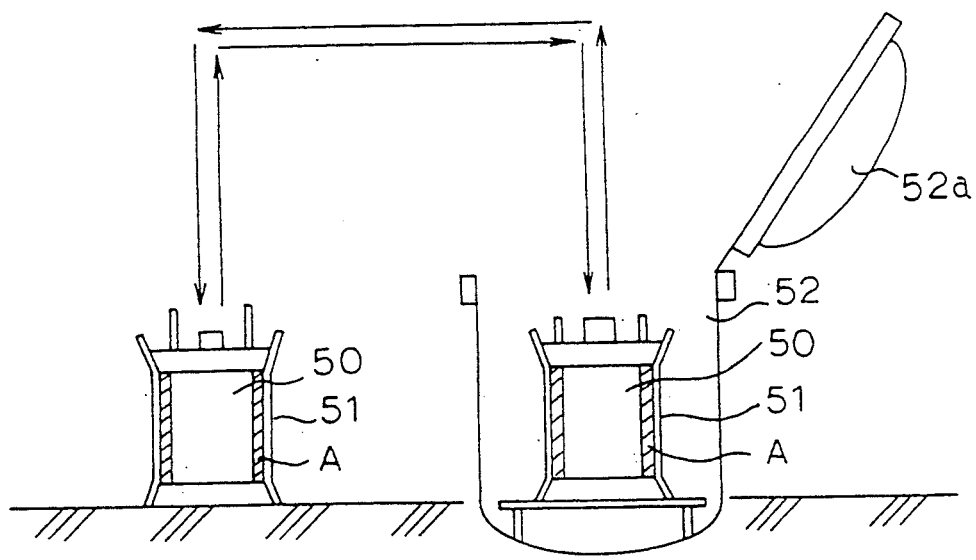
FIG. 10 is a schematic view showing the vulcanizing method using another conventional vulcanizing apparatus.

In the embodiment of the vulcanizing method shown in FIG. 6(d), the vulcanizing facility of the first step uses, as shown in FIG. 8, a vulcanizing apparatus similar to the aforementioned embodiment of FIGS. 1 to 5 but wherein a pair of soft rubber rolls 26 that can be extended or retracted by hydraulic cylinders 27 are used in place of the pressurizing bands 11. The second step uses the vulcanizing apparatus of the aforementioned embodiment of FIGS. 1 to 5, and the vulcanizing facility of the third step uses the vulcanizing apparatus of the aforementioned embodiment of FIGS. 1 to 5 but without the pressurizing rolls 4. The vulcanizing facility of the fourth step uses the oven-type heating chamber 25 of FIG. 7.

Three examples of the vulcanizing method have been described; which method is chosen may be determined according to the thickness and configuration of the rubber belt to be vulcanized. From the viewpoint of the size of the rubber belt, FIG. 6(c) is suited to a small size, FIG. 6(b) to a medium size, and FIG. 6(d) to a large size, but this should not be construed as limitations. As for the shifting of vulcanizing drums 2 to the vulcanizing facilities or stations of the respective vulcanizing steps, if the vulcanizing facilities are placed at regular intervals and the chuck stands 13 for transferring vulcanizing drums 2 are connected together at a distance corresponding to the distance between two vulcanizing facilities, the plurality of vulcanizing drums 2 can be transferred by one operation (step) simultaneously. Moreover, in the aforementioned embodiment, the vulcanizing drum 2 is arranged to be rotated by the rotation of the pressurizing bands 11. The vulcanizing drum 2, however, may be arranged to be turned by a drive unit in synchronization with the rotation of the pressurizing bands 11. The drum in the first step of FIG. 6(d) may be turned by a drive unit connected directly to it.

As will be clear from the explanation above, the invention has the following advantages or effects:

(1) In the vulcanizing apparatus according to the present invention, when an endless rubber belt molding is to be replaced, the molding may be replaced together with the vulcanizing drum. Hence it is easy to mount and remove the rubber belt molding in comparison with the conventional apparatus where the rubber belt molding is placed across two shafts.

(2) Pressurizing bands for pressurizing the unvulcanized rubber belt molding on the vulcanizing drum are arranged to oppose to each other. As a result, the vulcanizing drum is free of any unbalanced load, and the diameter of the support shaft for the drum can be reduced; thus the vulcanizing drum can be easily reduced in size.

(3) Because the rubber belt molding is placed over the outer circumferential surface of the vulcanizing drum, small-sized rubber belt moldings can be vulcanized.

(4) The rubber belt molding on the vulcanizing drum is heated entirely and evenly from the inside of the drum. Moreover, a greater part of the rubber belt molding is surrounded and pressurized by the pressurizing bands. As a result, the vulcanization of the rubber belt molding is effected evenly and efficiently, producing high quality rubber belts.

(5) The vulcanizing apparatus is capable of pressurizing the rubber belt molding on the vulcanizing drum with the pressurizing rolls as well as the pressurizing bands. When toothed rubber belts are to be produced, the apparatus can form teeth accurately.

(6) The vulcanizing method according to the present invention allows automatization of the vulcanizing operation. Thus the load on the workers can be lightened, and the number of required workers can be reduced significantly.

(7) As the vulcanizing process is subdivided into multiple steps, the vulcanizing time for each step can be reduced significantly in comparison with the conventional method. As a result, it is possible to overlap the operation time of one subdivided process with the operation time of a forming process before vulcanization or that of a cooling process after vulcanization; thus the vulcanization operation including the pre- and post-vulcanization processes can be made continuously. This will improve the productivity of rubber belts production and a reduction in cost can be accomplished with ease.

(8) The temperature setting for the first vulcanizing step and the first half of the second vulcanizing step improves the fluidity of the rubber in the rubber belt molding, and the molding will become optimal for forming. Moreover, the temperature setting for the second vulcanizing step and thereafter provides a condition well suited to integration and cross-linking of the respective constituent members of the rubber belt molding.

What is claimed is:

1. A vulcanizing apparatus for endless rubber belts comprising:
   a cylindrical vulcanizing drum for winding and molding cylindrical unvulcanized rubber belt materials thereover, said vulcanizing drum being removably and rotatably supported on a transfer mechanism, said vulcanizing drum being rotatable around a vertical axis thereof;
   a pair of endless pressurizing bands arranged to oppose each other with said vulcanizing drum between, said pressurizing bands being operable to arcuately surround and press opposing side portions of belt materials on the circumferential surface of said vulcanizing drum, said pressurizing bands each being placed over a pair of guide rolls and tension rolls with which said vulcanizing drum is surrounded, said cylindrical unvulcanized rubber belt materials having an area and said pair of bands pressing the majority of said area, said belt materials being uniformly bent by said drum;
   means for heating the circumferential surface of said drum by introducing steam into the interior of said vulcanizing drum from a center bore at one end of said drum, said drum contacting and uniformly heating the entire area of said belt materials; and
   means for pressing said bands against said vulcanizing drum and for synchronously, equidirectionally rotating said bands so as to turn said vulcanizing drum and continuously vulcanize the cylindrical unvulcanized rubber belt material.

2. A vulcanizing apparatus for endless rubber belts comprising:
   a cylindrical vulcanizing drum for winding and molding cylindrical unvulcanized rubber belt materials thereover, said vulcanizing drum being removably and rotatably supported on a transfer mechanism, said vulcanizing drum being rotatable around a vertical axis thereof;
   a pair of endless pressurizing bands arranged to oppose each other with said vulcanizing drum between, said pressurizing bands being capable of arcuately surrounding and pressing opposing side portions of the circumferential surface of said vulcanizing drum, said pressurizing bands each being placed over a pair of guide rolls and tension rolls which said vulcanizing drum is surrounded;
   means for heating the circumferential surface of said drum by introducing steam into the interior of said vulcanizing drum from a center bore at one end of said drum; and
   means for pressing said bands against said vulcanizing drum and for synchronously, equidirectionally rotating said bands so as to turn said vulcanizing drum and continuously vulcanize the cylindrical unvulcanized rubber belt material, and further including at least one pressurizing roll provided on each pressurizing band for pressing the circumferential surface of said vulcanizing drum, and means for moving said at least one pressurizing roll on each pressurizing band forward to and backward from each other.

* * * * *